United States Patent
Keshavan

(10) Patent No.: US 9,393,674 B2
(45) Date of Patent: Jul. 19, 2016

(54) CEMENTED CARBIDE COMPOSITE FOR A DOWNHOLE TOOL

(71) Applicant: Smith International, Inc., Houston, TX (US)

(72) Inventor: Madapusi K. Keshavan, The Woodlands, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 1 day.

(21) Appl. No.: 14/244,587

(22) Filed: Apr. 3, 2014

(65) Prior Publication Data
US 2014/0298728 A1   Oct. 9, 2014

Related U.S. Application Data

(60) Provisional application No. 61/808,355, filed on Apr. 4, 2013.

(51) Int. Cl.
*B24D 18/00* (2006.01)
*E21B 10/56* (2006.01)

(52) U.S. Cl.
CPC ........ *B24D 18/0054* (2013.01); *B24D 18/0009* (2013.01); *E21B 10/56* (2013.01)

(58) Field of Classification Search
None
See application file for complete search history.

(56) References Cited

U.S. PATENT DOCUMENTS

| | | | |
|---|---|---|---|
| 6,353,771 B1 | 3/2002 | Southland | |
| 7,262,240 B1* | 8/2007 | Breton | B05D 5/02 524/404 |
| 7,832,456 B2 | 11/2010 | Calnan et al. | |
| 7,832,457 B2 | 11/2010 | Calnan et al. | |
| 2001/0008190 A1* | 7/2001 | Scott et al. | 175/374 |
| 2006/0154068 A1* | 7/2006 | Otsuka et al. | 428/402 |
| 2008/0206576 A1* | 8/2008 | Qian et al. | 428/446 |
| 2010/0314176 A1* | 12/2010 | Zhang et al. | 175/383 |
| 2011/0120781 A1* | 5/2011 | Lockwood et al. | 175/425 |

FOREIGN PATENT DOCUMENTS

WO   2007127899 A2   11/2007

OTHER PUBLICATIONS

"Matrix printer promises 3d printing at 2d prices", Retrieved from the Internet: http://www.coolest-gadgets.com/20090917/matrix-printer-promises-3d-printing-2d-prices/, Retrieved on Sep. 10, 2014, 3 pages.
Three Dimensional Printing, "Tungsten Carbide Cutting Tools by 3D Printing", Retrieved from the Internet: http://web.mit.edu/tdp/www/6.html, Retrieved on Sep. 10, 2014, 1 page.

* cited by examiner

*Primary Examiner* — Michael P Rodriguez

(57) ABSTRACT

A carbide composite for a downhole tool may be formed by depositing a first layer on a substrate, and a second layer at least partially adjacent to the first layer. The first and second layers may each include carbides, metal binders, organic binders, or a combination thereof. The first and second carbide layers may have a different particle size, particle shape, carbide concentration, metal binder concentration, or organic binder concentration from one another.

20 Claims, 4 Drawing Sheets

CEMENTED CARBIDE COMPOSITE FOR A DOWNHOLE TOOL

CROSS-REFERENCE TO RELATED APPLICATION

This application claims priority to and the benefit of U.S. Provisional Application No. 61/808,355, filed on Apr. 4, 2013, entitled, "CEMENTED CARBIDE COMPOSITE FOR A DOWNHOLE TOOL" to Madapusi K. Keshavan, the entire contents of which are fully incorporated herein by reference.

BACKGROUND

Cemented carbide composites for downhole tools are often produced by using carbide dies and one or more carbide powders and binders. The process typically includes the design and fabrication of a die, followed by pressing a carbide powder in the die to provide an unsintered or "green" substrate. If additional features are desired in the cemented carbide composite that cannot be achieved by pressing or otherwise consolidating the powder, one or more machining and/or shaping processes are employed. For example, pressing the carbide powder may only provide limited features to the green substrate. Accordingly, one or more shaping processes may be utilized to provide additional features, e.g., undercuts and holes, to the green substrate. This conventional multi-step, powder metallurgy process for fabricating green carbide composites may be costly, complex, and time-consuming.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for fabricating a carbide composite for a downhole tool is disclosed. The method may include depositing a first layer on a substrate and depositing a second layer at least partially adjacent the first layer. The first and second layers may each include carbides, metal binders, organic binders, or a combination thereof. The first and second layers may have a different particle size, particle shape, carbide concentration, metal binder concentration, or organic binder concentration from one another. The first and second layers may be bound to one another to form the carbide composite.

Another method for fabricating a carbide composite for a downhole tool is disclosed. The method may include depositing a carbide layer on a substrate. The carbide layer may include tungsten carbide and cobalt. A second layer may be deposited at least partially on the carbide layer. The second layer may include carbides, metal binders, organic binders, diamond particles, or a combination thereof. The carbide layer and the second layer may have a different particle size, particle shape, carbide concentration, metal binder concentration, diamond particle concentration, or binder concentration from one another. The method may further include binding the carbide layer and the second layer to form the carbide composite. A polycrystalline diamond insert may be formed by sintering the carbide composite.

A carbide composite for a downhole tool is disclosed. The carbide composite may include a carbide layer bound to a second layer. The carbide layer may include tungsten carbide and cobalt. The second layer may be at least partially adjacent and bound to the carbide layer. The second layer may include carbides, metal binders, organic binders, or a combination thereof. The carbide layer and second layer may have a different particle size, particle shape, carbide concentration, metal binder concentration, or organic binder concentration from one another.

BRIEF DESCRIPTION OF THE DRAWINGS

Embodiments of the disclosure are described with reference to the following figures. The same numbers are used throughout the figures to reference like features and components.

DETAILED DESCRIPTION

Figure 1:
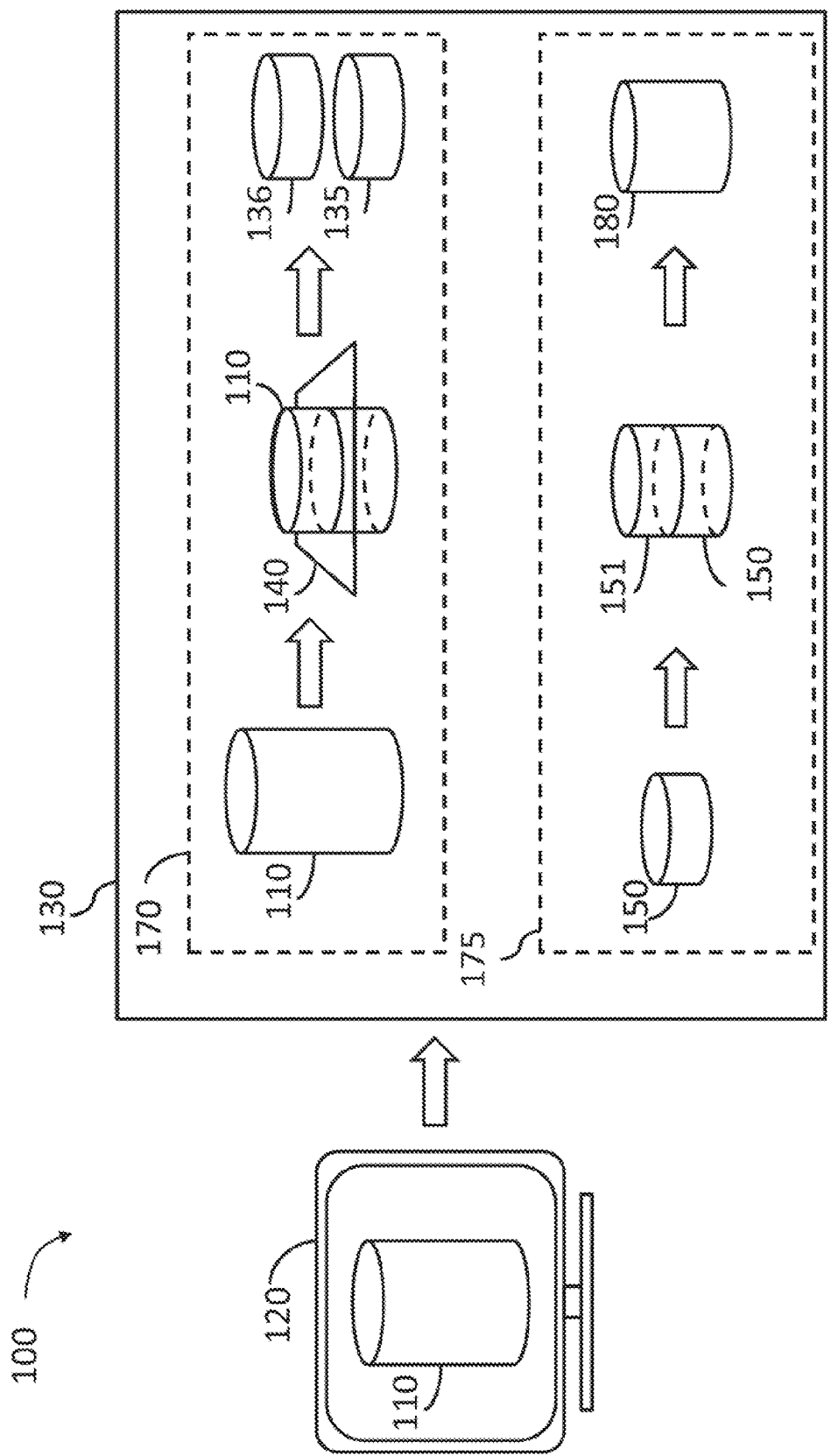
FIG. 1 depicts a schematic system for fabricating a carbide composite for a downhole tool via 3D printing, according to one or more embodiments disclosed.

A carbide composite fabricated via an additive manufacturing (AM) process or 3D printing may include at least two distinct layers, each made of or including one or more carbide compositions. The number of distinct layers may vary from a low of about 2, about 3, about 4, about 5, about 10, or about 15 to a high of about 20, about 30, about 50, about 150, about 200, about 250, about 300, about 400, about 500, or more.

Each layer may be or include one or more carbide compositions having one or more carbides, one or more metal binders, one or more organic binders, one or more diamond particles, or any combination thereof. By controlling the particle size, particle shape, carbide concentration, metal binder concentration, diamond particle concentration, and/or organic binder concentration of the carbide composition, each layer may be the same or different. For example, each layer may have the same carbide concentration, metal binder concentration, organic binder concentration, and/or diamond particle concentration but have different particle sizes. Similarly, each layer may also have the same carbide concentration, metal binder concentration, organic binder concentration, and/or diamond particle concentration but have different particle shapes. The relative concentrations of the carbide, metal binder and organic binder may be controlled to provide a layer that is distinct (i.e., different) from another. Other iterations and permutations of the foregoing parameters are envisioned to provide two or more distinct layers.

Suitable carbides may be or include refractory carbides or carbides of one or more transition metals from Groups IV to VI of the Periodic Table. Illustrative transition metals may include, but are not limited to, titanium, vanadium, chromium, zirconium, niobium, molybdenum, hafnium, tantalum, tungsten, or any mixture thereof. For example, the carbides may include tungsten carbide, vanadium carbide, titanium carbide, chromium carbide, zirconium carbide, niobium carbide, molybdenum carbide, hafnium carbide, tantalum carbide, or any mixtures or alloys thereof.

Suitable metal binders may include any one or more transition metals including, but not limited to, magnesium, ruthenium, osmium, iron, cobalt, nickel, copper, molybdenum, tantalum, tungsten, rhenium, or any mixture or alloy thereof. The metal binders may also include any alkali metals including, but not limited to, lithium, sodium, potassium, rubidium, cesium, or any mixture or alloy thereof.

Suitable organic binders may be or include one or more waxes or resins that are insoluble, or at least substantially insoluble, in water. Waxes may include, for example, animal waxes, vegetable waxes, mineral waxes, synthetic waxes, or any combination thereof. Illustrative animal waxes may include, but are not limited to, bees wax, spermaceti, lanolin, shellac wax, or any combination thereof. Illustrative vegetable waxes may include, but are not limited to, carnauba, candelilla, or any combination thereof. Illustrative mineral waxes may include, but are not limited to, ceresin and petroleum waxes (e.g., paraffin wax). Illustrative synthetic waxes may include, but are not limited to, polyolefins (e.g., polyethylene), polyol ether-esters, chlorinated naphthalenes, hydrocarbon waxes, or any combination thereof. The organic binder may also include waxes that are insoluble in organic solvents. Illustrative waxes that are insoluble in organic solvents may include, but are not limited to, polyglycol, polyethylene glycol, hydroxyethylcellulose, tapioca starch, carboxymethylcellulose, or any combination thereof. Illustrative organic binders may also include, but are not limited to, starches, and cellulose, or any combination thereof. The organic binders may also include, but are not limited to, microwaxes or microcrystalline waxes. Microwaxes may include waxes produced by de-oiling petrolatum, which may contain a higher percentage of isoparaffinic and naphthenic hydrocarbons as compared to paraffin waxes.

Suitable diamond particles may be naturally occurring and/or synthetically produced. The diamond particles may have a particle size or average grain size from a low of about 1 micron (μm), about 2 μm, about 3 μm, about 5 μm, or about 10 μm to a high of about 15 μm, about 20 μm, about 30 μm, about 40 μm, about 50 μm, about 60 μm, about 70 μm, about 80 μm, about 90 μm, about 180 μm, or more. For example, the diamond particles may have a particle size or average grain size from about 1 μm to about 180 μm, about 5 μm to about 90 μm, about 10 μm to about 80 μm, about 20 μm to about 70 μm, about 30 μm to about 60 μm, or about 40 μm to about 50 μm.

FIG. 1 depicts a schematic system 100 for fabricating a carbide composite 180 for a downhole tool via 3D printing, according to one or more embodiments. The system 100 may include a computer aided design (CAD) assembly 120 and a layering device 130. The CAD assembly 120 may be or include any software of a computer aided device capable of providing a geometry or digital design 110 for the carbide composite 180 in three dimensions. The digital design 110 may be used as a template or guide by the layering device 130 to fabricate the carbide composite 180, as further describe herein. The layering device 130 may be or include any device capable of fabricating the carbide composite 180 using the digital design 110 as a template or guide.

Figure 2:
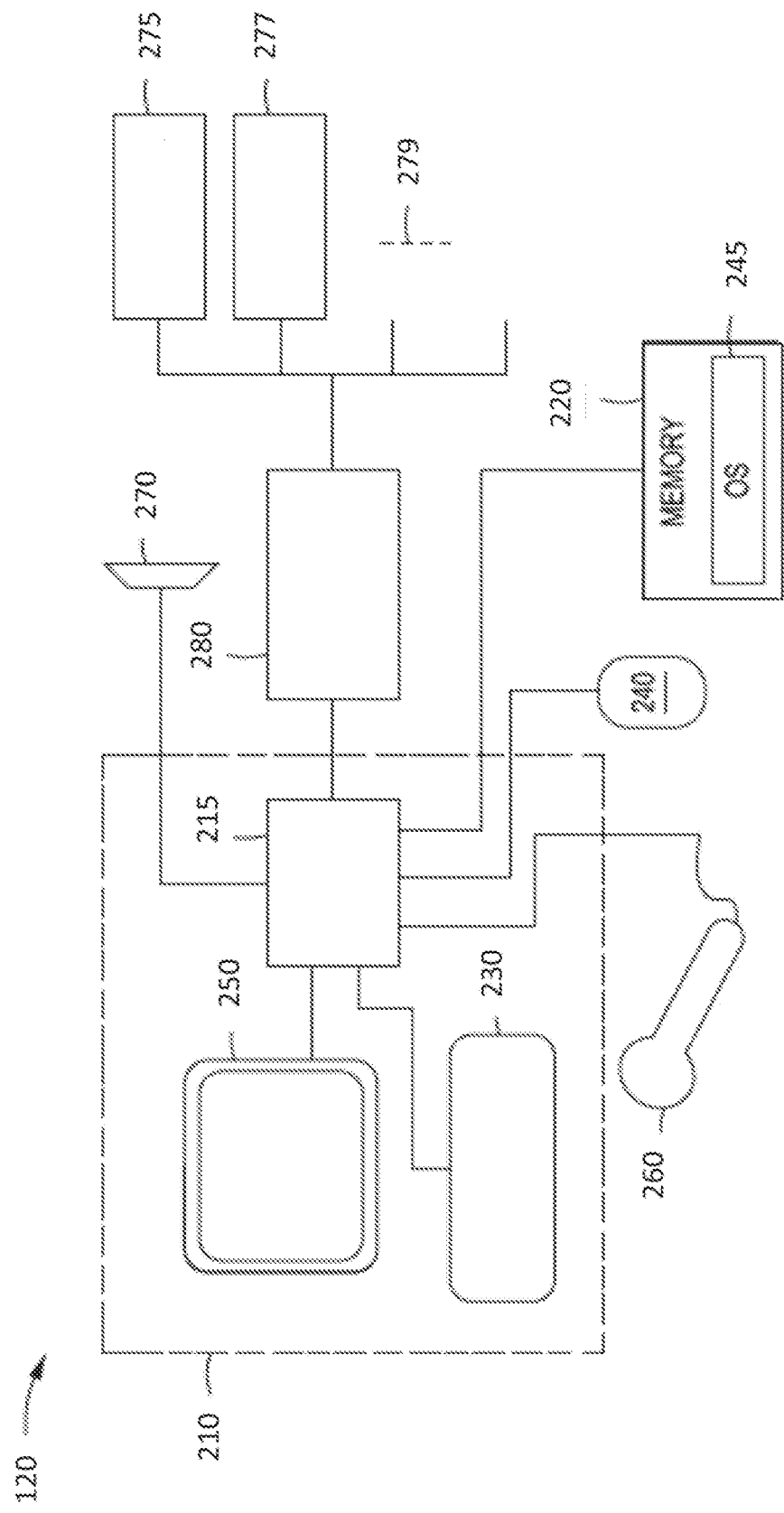
FIG. 2 depicts an illustrative CAD assembly for providing a digital design for the carbide composite in three dimensions, according to one or more embodiments disclosed.

FIG. 2 depicts an illustrative CAD assembly 120 for providing the digital design 110 for the carbide composite 180 in three dimensions, according to one or more embodiments. The CAD assembly 120 may include one or more computers 210 that may include one or more central processing units 215, one or more input devices or keyboards 230, and one or more monitors 250 on which a software application may be executed. The computer 210 may also include a memory 220 as well as one or more input and output devices, for example a mouse 240, a microphone 260, and a speaker 270. The mouse 240, the microphone 260, and the speaker 270 may be used for, among other purposes, universal access and voice recognition or commanding. The monitor 250 may be touch-sensitive to operate as an input device as well as a display device.

The computer 210 may interface with one or more databases 277, support computers or processors 275, other databases and/or other processors 279, or the Internet via the network interface 280. It should be understood that the term "interface" refers to any possible external interfaces, wired or wireless. It should also be understood that the database 277, processor 275, and/or other databases and/or other processors 279 are not limited to interfacing with the computer 210 using the network interface 280 and may interface with the computer 210 in any means sufficient to create a communications path between the computer 210 and database 277, the processor 275, and/or other databases and/or other processors 279. For example, the database 277 may interface with the computer 210 via a USB interface while the processor 275 may interface via some other high-speed data bus without using the network interface 280. The computer 210, the processor 275, and the other processors 279 may be integrated into a multiprocessor distributed system.

It should be understood that even though the computer 210 is shown in FIG. 2 as a platform on which the methods discussed and described herein may be performed, the methods discussed and described herein may be performed on any platform. For example, the many and varied embodiments discussed and described herein may be used on any device that has computing capability. For example, the computing capability may include the capability to access communications bus protocols such that the user may interact with the many and varied computers 210, processors 275, and/or other databases and processors 279 that may be distributed or otherwise assembled. These devices may include, but are not limited to, supercomputers, arrayed server networks, arrayed memory networks, arrayed computer networks, distributed server networks, distributed memory networks, distributed computer networks, desktop personal computers (PCs), tablet PCs, hand held PCs, laptops, devices sold under the trademark names BLACKBERRY™, PALM™, SAMSUNG™, or APPLE™, cellular phones, hand held music players, or any other device or system having computing capabilities.

Still referring to FIG. 2, programs or software may be stored in the memory 220, and the central processing unit 215 may work in concert with the memory 220, the input device 230, and the output device 250 to perform tasks for the user. The memory 220 may include, but is not limited to, any number and combination of memory devices that are currently available or may become available in the art. For example, the memory devices may include, but are not limited to, the database 277, other databases and/or processors 279, hard drives, disk drives, random access memory, read memory, electronically erasable programmable read memory, flash memory, thumb drive memory, and any other memory device. Those skilled in the art are familiar with the many variations that may be employed using memory devices, and no limitations should be imposed on the embodiments herein due to memory device configurations and/or algorithm prosecution techniques. The memory 220 may store an operating system (OS) 245 and/or any software of the computer assisted device capable of providing the digital design 110. The operating system 245 may facilitate, control, and execute the software using a central processing unit 215. Any available operating system may be used in this manner including WINDOWS™, LINUX™, Apple OS™, UNIX™, and the like. The central processing unit 215 may execute the software from a user requests or automatically.

Referring now FIGS. 1 and 2, the digital design 110 from the CAD assembly 120 may include data defining one or more portions of the carbide composite 180. For example, the digital design 110 may include data defining an inner surface, an outer surface, and/or a volume of the carbide composite 180 to be fabricated by the layering device 130. The digital design 110 may be communicated to the layering device 130 and may provide a template or guide to fabricate the carbide composite 180.

The layering device 130 may be or include any device capable of fabricating the carbide composite 180 from the digital design 110. The layering assembly 130 may fabricate the carbide composite 180 from the digital design 110 of the CAD assembly 120 in one or more processes 170, 175 as further described herein. Any suitable layering device 130 may be used. Suitable commercially available layering devices 130 include, but are not limited to, PROJET 1000™, PROJET 1500™, PROJET SD 3500™, PROJET HD 3500™, PROJET HD 3500PLUS™, PROJET 3500 HDMAX™, PROJET CP 3500™, PROJET CPX 3500™, PROJET CPX 3500PLUS™, PROJET 3500 CPXMAX™, PROJET 7000™, PROJET 6000™, PROJET 5000™, PROJET DP 3500™, PROJET MP 3500™, ZPRINTER 150™, ZPRINTER 250™, ZPRINTER 350™, ZPRINTER 4501™, ZPRINTER 650™, and/or ZPRINTER 850™, which are available from 3D Systems Corp.

A first process 170 in fabricating the carbide composite 180 from the digital design 110 may be or include a digital process 170. The digital process 170 may include dividing or partitioning the digital design 110 from the CAD assembly 120 into two or more digital cross-sections (two are shown 135, 136) using one or more horizontal planes 140. The layering device 130 may divide or partition the digital design 110 into any number of cross-sections 135, 136 using any number of digital horizontal planes 140. For example, the number of cross-sections 135, 136 may vary from a low of about 2, about 3, about 4, about 5, about 10, or about 15 to a high of about 20, about 30, about 50, about 150, about 200, about 250, about 300, about 400, about 500, or more.

The digital cross-sections 135, 136 may provide a template or guide for forming one or more slices 150, 151 of the carbide composite 180 in a second process 175 of the layering device 130. The digital cross-sections 135, 136 may be two-dimensional or three-dimensional and may include an outer cross-sectional line, an inner cross-sectional line, a cross-sectional area, a volume, or any combination thereof. The outer and inner cross-sectional lines of the digital cross-sections 135, 136 may define an outer and inner surface of each of the slices 150, 151, respectively, and the cross-sectional area may be or define a volume of each of the slices 150, 151. Each of the digital cross-sections 135, 136 may define one or more portions or slices 150, 151 of the carbide composite 180, respectively, and may be used as a template for building the slices 150, 151 of the carbide composite 180. For example, as shown in FIG. 1, a first digital cross-section 135 may define a first slice 150 of the carbide composite 180 and may be used by the layering assembly 130 as a template to fabricate the first slice 150. Similarly, a second digital cross-section 136 may define a second slice 151 of the carbide composite 180 and may be used by the layering assembly 130 as a template to fabricate the second slice 151.

The layering device 130 may fabricate the carbide composite 180 in one or more portions or slices 150, 151 in a second process 175. The second process 175 may include forming the slices 150, 151 using the digital cross-sections 135, 136 as a template and binding the slices 150, 151 to one another to build the carbide composite 180. For example, the layering device 130 may fabricate the carbide composite 180 by forming a first slice 150 of the carbide composite 180, forming a second slice 151 of the carbide composite 180, and combining or binding the first and second slices 150, 151 to one another to form the carbide composite 180. Any number of slices 150, 151 may be formed and/or bound to one another to form the carbide composite 180. For example, the number of slices 150, 151 may vary from a low of about 2, about 3, about 4, about 5, about 10, or about 15 to a high of about 20, about 30, about 50, about 150, about 200, about 250, about 300, about 400, about 500, or more.

Each of the slices 150, 151 may be a mono-layer slice 150, 151 or a multi-layer slice 150, 151. The layering device 130 may deposit one or more first layers of the carbide composition having dimensions corresponding to the first digital cross-section 135 on a substrate to form the first slice 150. The layering device 130 may deposit one or more second or subsequent layers of the carbide composition having dimensions corresponding to the second digital cross-section 136 on or adjacent the first layers to form the second slice 151. Any of the layers deposited by the layering device 130 may provide or be a substrate for any subsequent layer deposited by the layering device 130. For example, the first layer deposited by the layering device 130 may also be a substrate for the second layer or any subsequent layers. The layering device 130 may bind or fuse the first and second slices 150, 151 to one another to fabricate the carbide composite 180.

To facilitate discussion of different multi-layer slices 150, 151, the following notation is used herein. Each layer of a slice 150, 151 is denoted as a different letter, such as A, B, C, D, E, etc., depending on the number of distinct layers. When a slice 150, 151 includes more than one layer such as more than one A layer, one or more prime symbols (', ", ''', etc.) are appended to the A symbol (e.g., A', A", etc.) to indicate layers of the same type that may be the same or may differ in one or more properties, such as carbide composition, particle size, particle shape, carbide concentration, metal binder concentration, diamond particle concentration, and/or organic binder concentration, etc., within the range of these parameters defined herein. Finally, the symbols for adjacent layers are separated by a slash (/). Using this notation, a three-layer slice 150, 151 may be denoted A/B/A or A/C/A. Similarly, a five-layer slice 150, 151 of alternating layers may be denoted A/B/A'/B'/A". Unless otherwise indicated, the left-to-right or right-to-left order of layers is arbitrary, and the order of prime symbols; e.g., an A/B slice 150, 151 is equivalent to a B/A slice 150, 151 and an A/A'/B/A" slice 150, 151 is equivalent to an A/B/A'/A" slice 150, 151. When a multilayer slice 150, 151 has two or more of the same layers, such as two or more B layers for example, the B layers may be the same, or may differ in carbide composition, particle size, particle shape, carbide concentration, metal binder concentration, diamond particle concentration, and/or organic binder concentration.

Multilayer slices 150, 151 having any of the following illustrative structures may be used:

(a) two-layer slices 150, 151, such as A/B and B/B';

(b) three-layer slices 150, 151, such as A/B/A', A/A'/B, A/B/B', B/A/B', B/B'/B", A/B/A, A/B/C, and A/C/A;

(c) four-layer slices 150, 151, such as A/A'/A"/B, A/A'/B/A", A/A'/B/B', A/B/B'/A', B/A/A'/B', A/B/B'/B", B/A/B'/B", and B/B'/B"/B''';

(d) five-layer slices 150, 151, such as A/A'/A"/A'''/B, A/A'/A"/B/A''', A/A'/B/A"/A''', A/A'/A"/B/B', A/A'/B/A"/B', A/A'/B/B'/A", A/B/A'/B'/A", A/B/A'/A"/B, A/A/A"/B', A/A'/B/B'/B", A/B/A'/B'/B", A/B/B'/B"/A', B/A/A'/B'/B", B/A/B'/A'/B", B/A/B'/B"/A', B/A/B'/B"/B''', B/A/B'/B"/B''', B/B'/A/B''/B''', B/B'/B"/B'''/B'''', and A/B/C/B/A; and similar structures for slices 150, 151 having six, seven, eight, nine, 10, 11, 12, 15, 20, 30, 50, 150, 200, 250, 300, 400, 500, or more layers. It should be appreciated that slices 150, 151 having still more layers may be used.

The thickness of each of the layers deposited by the layering device 130 is not particularly limited, but may be determined according to the desired properties of the carbide composite 180, the properties of the carbide composition, the layering device 130, or any combination thereof. For example, each of the layers deposited by the layering device may have a thickness from a low of about 0.0005 cm, about 0.001 cm, about 0.002 cm, about 0.005 cm, or about 0.01 cm to a high of about 0.03 cm, about 0.035 cm, about 0.04 cm, about 0.045 cm, about 0.05 cm, about 0.055 cm, about 0.06 cm, or more. In another example, the layers deposited by the layering device may have a thickness from about 0.001 cm to about 0.06 cm, about 0.002 to about 0.05 cm, about 0.005 to about 0.04 cm, or about 0.01 to about 0.03 cm. Those skilled in the art will appreciate that the thickness of the layers for multilayer slices 150, 151 may be adjusted based on desired end use performance, equipment capabilities, carbide composition capabilities, as well as other additional factors.

Figure 3:
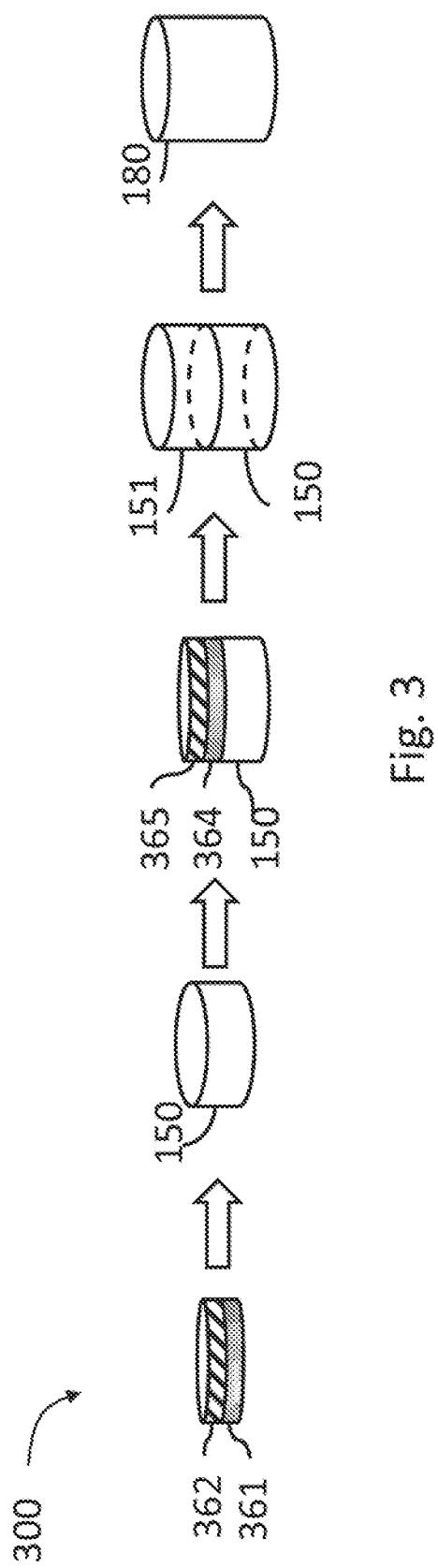
FIG. 3 depicts an illustrative process for forming and binding the slices of the carbide composite, according to one or more embodiments disclosed.

FIG. 3 depicts an illustrative process 300 for forming and binding multi-layer slices 150, 151 of the carbide composite 180, according to one or more embodiments. One or more layers 361, 362 may be deposited onto one another in a pattern or geometry corresponding to the first digital cross-section 135. As previously discussed, any of the one or more layers 361, 362 may be or provide a substrate for subsequent layers 361, 362. For example, a first carbide layer 361 may be deposited on a substrate or may be the substrate for a subsequent layer, e.g. a second carbide layer 362. In another example, a first carbide layer 361 may be deposited on a substrate (e.g., substrate provided by the layering device 130 or another carbide layer of the carbide composite 180), and a second carbide layer 362 may be deposited on or adjacent to the first carbide layer 361. The first and second carbide layers 361, 362 may be bound to one another to form the first slice 150 of the carbide composite 180. One or more subsequent layers 364, 365 may be deposited onto one another in a pattern or geometry corresponding to the second digital cross-section 135 to form the second slice 151 of the carbide composite. For example, a third carbide layer 364 may be deposited on or adjacent to the second carbide layer 362 or the first slice 150, and a fourth carbide layer 365 may be deposited on or adjacent to the third carbide layer 364. The third and fourth carbide layers 364, 365 may be bound to one another to form the second slice 151 of the carbide composite 180. The second slice 151 may be disposed on or adjacent to the first slice 150.

The layers 361, 362, 364, 365 may be heated to a melting point of the carbide composition to bind the layers 361, 362, 364, 365 to one another and form the slices 150, 151. For example, one or more layers 361, 362, 364, 365 may include a carbide composition having a mixture of the carbide, the metal binder, the diamond particles, and the organic binder. The carbide composition in the layers 361, 362, 364, 365 may be heated to a melting point of the organic binder contained therein to form the first slice 150. Heating the organic binder to its melting point may increase a tack of the organic binder, thereby increasing its ability to bind the carbide, the metal binder, the diamond particles, or other organic binders in the carbide composition.

The layers 361, 362, 364, 365 of the slices 150, 151 may also be bound to one another by providing one or more adhesives or coupling agents in one or more layers 361, 362, 364, 365 of the slices 150, 151. At least one layer 361, 362, 364, 365 of the slices 150, 151 may include an adhesive or coupling agent to bind adjacent layers 361, 362, 364, 365 of the slices 150, 151. For example, the layering device 130 may deposit the first layer 361 of a carbide composition having the adhesive therein and subsequently deposit the second layer 362 of a carbide composition including the carbide, the metal binder, the diamond particles, or any combination thereof on or adjacent to the first layer 361. The adhesive in the first layer 361 may bind the carbide, the metal binder, and/or the diamond particles in the second layer 362 to form the first slice 150. A subsequent layer 364 of the carbide composition including the adhesive may be deposited on or adjacent to the first slice 150, and another layer 365 of the carbide composition including the carbide, the metal binder, the diamond particles, or any combination thereof may be deposited on or adjacent to the layer 364 to form the second slice 151. The adhesive or coupling agents may include any of the organic binders and/or any other suitable adhesive capable of coupling the layers 361, 362, 364, 365 and/or slices 150, 151 to one another.

The slices 150, 151, whether mono-layer or multi-layer, may be heated to a melting point of the carbide composition to bind the slices 150, 151 to one another to fabricate the carbide composite 180. For example, one or more of the slices 150, 151 may include a carbide composition having a mixture of the carbide, the metal binder, the diamond particles, the organic binder, or any combination thereof. The slices 150, 151 may be heated to a melting point of the organic binder contained therein to bind the first slice 150 to the second slice 151. The slices 150, 151 may also be bound to one another by providing an adhesive or coupling agent between the slices 150, 151. The adhesive or coupling agent contained in the layers 361, 362, 364, 365 of the slices 150, 151 may also bind the slices 150, 151 to one another to fabricate the carbide composite 180. The adhesive or coupling agents may include any of the organic binders and/or any other suitable adhesive capable of coupling the layers 361, 362, 364, 365 and/or slices 150, 151 to one another.

The carbide composite 180 may be tailored for a particular downhole tool or downhole application by controlling one or more properties of the carbide composite in the layers 361, 362, 364, 365 deposited by the layering device 130. Illustrative properties of the carbide composition that may be controlled may include, but are not limited to, particle shape, particle size, and/or composition. The relative concentration of the carbides, the metal binders, the organic binders, and/or the diamond particles in the carbide compositions may also be controlled to provide the carbide composite 180. For example, each of the layers 361, 362, 364, 365 may have the same carbide concentration, metal binder concentration, organic binder concentration, or diamond particle concentration but have a different particle size. Each layer 361, 362, 364, 365 may also have the same carbide concentration, metal binder concentration, organic binder concentration, or diamond particle concentration but have different particle shapes.

The carbide composite 180 may also be tailored for a particular downhole tool or downhole application by controlling the relative concentration of the carbides, the metal binders, the organic binders, and/or the diamond particles deposited in one or more portions (not shown) of each individual layer 361, 362, 364, 365. For example, a center portion (not shown) of one or more layers 361, 362, 364, 365 may have a higher concentration of the carbides, the metal binders, the organic binders, and/or the diamond particles than an outer portion (not shown) of the layer 361, 362, 364, 365. The center portion of the layers 361, 362, 364, 365 may have a higher or lower concentration of the carbides, the metal binders, the organic binders, and/or the diamond particles and the concentration may increase and/or decrease radially to the outer portion of the layer 361, 362, 364, 365. Similarly, the properties of the carbide composition (e.g., particle shape, particle size, and/or composition) may also vary throughout one or more portions of each individual layer 361, 362, 364, 365. The concentration and/or the properties of the carbide composition deposited in the one or more portions of each individual layer 361, 362, 364, 365 may be determined by the particular downhole tool or downhole application. For example, the concentration and/or the properties of the carbide composition deposited on an outer portion of the layers 361, 362, 364, 365 may be different than the concentration and/or properties of the carbide composition deposited on an inner portion of the layers 361, 362, 364, 365 to provide increased strength or toughness to the outer and/or inner portions. The concentration and/or properties of the carbide composition deposited in the one or more portions of each individual layer 361, 362, 364, 365 may also be determined by one or more heating and/or pressing processes applied to the carbide composite 180. For example, the concentration and/or the properties of the carbide composition deposited in each portion of the layers 361, 362, 364, 365 may be varied to account for a shrinkage of the carbide composite 180 resulting from heating and/or pressing the carbide composite 180.

Varying the concentrations of the carbides, the metal binders, the organic binders, the diamond particles, or any combination thereof in the carbide composition in the layers 361, 362, 364, 365 and/or the slices 150, 151 may determine, at least in part, the strength, hardness, toughness, and/or the wear resistance of the carbide composite 180. For example, increasing the concentration of the metal binder may increase the fracture toughness and/or decrease the wear resistance of the carbide composite 180. The concentration of the carbide, the metal binder, the diamond particles, and/or the organic binder deposited by the layering device 130 may also increase and/or decrease a density of the carbide composite 180.

The carbide compositions deposited in the layers 361, 362, 364, 365 by the layering device 130 may be or include a mixture of one or more carbides, metal binders, diamond particles, and/or organic binders. The concentration of the carbides may be from a low of about 5 wt %, about 10 wt %, about 15 wt %, about 20 wt %, about 25 wt %, about 30 wt %, about 40 wt %, or about 50 wt % to a high of about 50 wt %, about 60 wt %, about 70 wt %, about 80 wt %, about 90 wt %, about 95 wt %, or more, based on the combined weight of the carbides, diamond particles, the metal binders, and/or the organic binders. For example, carbide compositions that include a mixture of the carbides, the metal binders, diamond particles, and/or the organic binders may have a carbide concentration from about 5 wt % to about 95 wt %, about 15 wt % to about 90 wt %, about 20 wt % to about 80 wt %, about 25 wt % to about 70 wt %, or about 50 wt % to about 60 wt %, based on the combined weight of the carbides, the metal binders, diamond particles, and/or the organic binders.

The concentration of the metal binders deposited in the layers 361, 362, 364, 365 by the layering device 130 may be from a low of about 5 wt %, about 10 wt %, about 15 wt %, about 20 wt %, about 25 wt %, about 30 wt %, about 40 wt %, or about 50 wt % to a high of about 50 wt %, about 60 wt %, about 70 wt %, about 80 wt %, about 90 wt %, about 95 wt %, or more, based on the combined weight of the carbides, the metal binders, diamond particles, and/or the organic binders. For example, carbide compositions that include a mixture of the carbides, the metal binders, diamond particles, and/or the organic binders may have a metal binder concentration from about 5 wt % to about 95 wt %, about 15 wt % to about 90 wt %, about 20 wt % to about 80 wt %, about 25 wt % to about 70 wt %, or about 50 wt % to about 60 wt %, based on the combined weight of the carbides, the metal binders, diamond particles, and/or the organic binders.

The organic binder may be provided in a concentration suitable for enhancing the binding of the carbides, the metal binders, the diamond particles, and/or the organic binders in the carbide composition. The organic binder may also be provided in a concentration suitable for binding the layers 361, 362, 364, 365 to one another to form the slices 150, 151. The organic binder may also be provided in a concentration suitable for binding the slices 150, 151 to one another to build the carbide composite 180. For example, the organic binder may be provided as an adhesive or coupling agent to securely bind the carbides, the metal binders, the diamond particles, and/or the organic binders in the layers 361, 362, 364, 365 and/or between adjacent layers 361, 362, 364, 365.

Similarly, the organic binder may be provided as an adhesive or coupling agent to securely bind the slices 150, 151 to one another to build the carbide composite 180. The organic binder may also be provided in a concentration suitable to provide sufficient hardness and/or toughness to the carbide composite 180. The organic binder may also be provided in a concentration suitable for promoting the flow of the carbide composition in the layering device 130. For example, the organic binder may be provided in a concentration that facilitates the flow of the carbide composition through a nozzle or printer head (not shown) of the layering device 130 during one or more deposition processes.

The concentration of the organic binders may be from a low of about 0.5 wt %, about 0.8 wt %, about 1 wt %, about 1.2 wt %, about 1.5 wt %, about 1.8 wt %, about 2 wt %, about 2.2 wt %, about 2.5 wt %, about 2.8 wt %, about 3 wt %, about 3.2 wt %, about 3.5 wt %, or about 3.8 wt %, about 4 wt %, about 5 wt %, about 8 wt %, about 10 wt %, about 15 wt %, about 20 wt %, about 25 wt %, or about 30 wt % to a high of about 35 wt %, about 40 wt %, about 50 wt %, about 60 wt %, about 70 wt %, about 80 wt %, about 90 wt %, about 95 wt %, or more, based on the combined weight of the carbides, the metal binders, diamond particles, and/or the organic binders. For example, carbide compositions that include a mixture of the carbides, the metal binders, diamond particles, and/or the organic binders may have an organic binder concentration from about 0.5 wt % to about 5 wt %, about 0.8 wt % to about 4 wt %, about 1 wt % to about 3.8 wt %, about 1.2 wt % to about 3.5 wt %, or about 1.5 wt % to about 3.2 wt %, based on the combined weight of the carbides, the metal binders, diamond particles, and/or the organic binders.

The concentration of the diamond particles may be from a low of about 0.5 wt %, about 0.8 wt %, about 1 wt %, about 1.2 wt %, about 1.5 wt %, about 1.8 wt %, about 2 wt %, about 2.2 wt %, about 2.5 wt %, about 2.8 wt %, about 3 wt %, about 3.2 wt %, about 3.5 wt %, or about 3.8 wt %, about 4 wt %, about 5 wt %, about 8 wt %, about 10 wt %, about 15 wt %, about 20 wt %, about 25 wt %, or about 30 wt % to a high of about 35 wt %, about 40 wt %, about 50 wt %, about 60 wt %, about 70 wt %, about 80 wt %, about 90 wt %, about 95 wt %, or more, based on the combined weight of the carbides, the metal binders, the organic binders, and/or the diamond particles. For example, carbide compositions that include a mixture of the carbides, the metal binders, and/or the organic binders may have a diamond particle concentration from about 5 wt % to about 95 wt %, about 15 wt % to about 90 wt %, about 20 wt % to about 80 wt %, about 25 wt % to about 70 wt %, or about 50 wt % to about 60 wt %, based on the combined weight of the carbides, the metal binders, the organic binders, and/or the diamond particles.

The particle shapes and/or sizes of the carbide compositions may be controlled by subjecting the carbide compositions to one or more processes. The carbide compositions may also be mixed, combined, or otherwise agglomerated to provide carbide compositions having a mixture of the carbides, the metal binders, the organic binders, and/or the diamond particles. The shaping or sizing of the particles in the carbide compositions and the mixing or agglomeration of the carbide compositions may be performed simultaneously in one or more processes. Illustrative shaping, sizing, mixing, and/or agglomeration processes may include, but are not limited to, milling, granulation, or any combination thereof.

The carbide composition may be milled to mix the carbides, the metal binders, the organic binders, and/or the diamond particles contained therein. The carbide composition may also be milled to coat or embed the carbides, the metal binders, the organic binders, and/or the diamond particles with the metal binders and/or the organic binders. For example, a carbide composition having a mixture of the carbides and the metal binders may be milled to coat the carbides with the metal binders, thereby providing a carbide composition having carbides coated with an alkali metal, a transition metal, or any mixture or alloy thereof. The carbide composition having a mixture of the carbides, the metal binders, the organic binders, and/or the diamond particles may also be milled to coat or embed the carbides, the metal binders, the organic binders, and/or the diamond particles within the organic binders contained therein. The carbide composition may also be milled to reduce the particle size of the carbides, the metal binders, the organic binders, and/or the diamond particles contained therein to provide fine particles of the carbide composition. The carbide composition may also be milled to shape the particles therein to provide particles having irregular and/or angular shapes. The size and/or shape of the particles may be determined, at least in part, by the amount or time in which the carbide compositions are subjected to the milling processes. Illustrative milling processes may include, but are not limited to, milling with milling media (e.g., ball milling and attritor milling), milling with a colloid mill, wet milling, or any combination thereof.

The milled carbide compositions may have an average particle size from a low of about 0.1 micron ($\mu$m), about 0.2 $\mu$m, about 0.3 $\mu$m, about 0.4 $\mu$m, about 0.5 $\mu$m, about 0.6 $\mu$m, about 0.7 $\mu$m, about 0.8 $\mu$m, about 0.9 $\mu$m, about 1 micron ($\mu$m), about 2 $\mu$m, about 3 $\mu$m, about 5 $\mu$m, about 10 $\mu$m, about 15 $\mu$m, about 20 $\mu$m, about 30 $\mu$m, about 40 $\mu$m, about 50 $\mu$m, about 60 $\mu$m, about 70 $\mu$m, about 80 $\mu$m, about 90 $\mu$m, about 180 $\mu$m, or about 150 $\mu$m to a high of about 160 $\mu$m, about 170 $\mu$m, about 180 $\mu$m, about 190 $\mu$m, about 200 $\mu$m, about 210 $\mu$m, about 220 $\mu$m, about 230 $\mu$m, about 240 $\mu$m, about 250 $\mu$m, or more. The milled carbide compositions may also have an average particle size from about 0.1 $\mu$m to about 250 $\mu$m, about 2 $\mu$m to about 200 $\mu$m, about 5 $\mu$m to about 190, about 10 $\mu$m to about 180, about 15 $\mu$m to about 170, about 20 $\mu$m to about 160, about 0.5 $\mu$m to about 1 $\mu$m, about 0.1 $\mu$m to about 1 $\mu$m, about 0.5 $\mu$m to about 10 $\mu$m, or about 50 $\mu$m to about 150 $\mu$m.

The carbide composition may be granulated to provide particles having a uniform shape, size, concentration, or any combination thereof. Granulation may include a process of forming or crystallizing the carbide composition into grains. Granulation may be utilized to prevent the segregation of one or more components of the carbide composition. For example, segregation may cause higher density components to separate from lower density components. Accordingly, granulating the carbide composite may provide a mixture where each of the components of the carbide composite have a uniform concentration throughout. Granulation may also improve compaction of the carbide composition by providing a more uniform distribution of one or more binders throughout the particles of the carbide composition. Granulation may provide particles with improved flow properties. For example, the carbide composition may include irregular shapes and/or surface characteristics before granulation that result in cohesion of the particles to one another. Granulation of the particles of the carbide composition may provide larger more isodiametric particles, which may improve flow properties of the carbide composition. The milled carbide composition may also be granulated to provide particles having a uniform shape, size, concentration, or any combination thereof. For example, granulating the milled carbide composition containing a mixture of the carbides, the metal binders, the diamond particles, and/or the organic binders may provide spherical or rounded shaped bodies having similar concentrations and/or compositions of the carbides, the metal binders, the diamond particles, and/or the organic binders. The carbide composition may be granulated to increase the apparent density of the carbide composition. For example, the granulated carbide composition may have an increased apparent density as compared to the milled carbide composition. Illustrative granulation processes may include, but are not limited to, freeze granulation, sieve granulation, spray drying, or any combination thereof.

The granulated carbide composition may have an average particle size greater than the particle size of the carbides, the metal binders, the organic binders, and/or the diamond particles. For example, the average particle size of the granulated carbide composition may be greater than the carbides, the metal binders, the organic binders, and/or the diamond particles by two to three orders of magnitude. The granulated carbide compositions may have an average particle size from a low of about 1 micron ($\mu$m), about 2 $\mu$m, about 3 $\mu$m, about 5 $\mu$m, about 10 $\mu$m, about 15 $\mu$m, about 20 $\mu$m, about 30 $\mu$m, about 40 $\mu$m, about 50 $\mu$m, about 60 $\mu$m, about 70 $\mu$m, about 80 $\mu$m, about 90 $\mu$m, about 180 $\mu$m, or about 150 $\mu$m to a high of about 160 $\mu$m, about 170 $\mu$m, about 180 $\mu$m, about 190 $\mu$m, about 200 $\mu$m, about 210 $\mu$m, about 220 $\mu$m, about 230 $\mu$m, about 240 $\mu$m, about 250 $\mu$m, or more. The granulated carbide compositions may also have an average particle size from about 1 $\mu$m to about 250 $\mu$m, about 2 $\mu$m to about 200 $\mu$m, about 5 $\mu$m to about 190, about 10 $\mu$m to about 180, about 15 $\mu$m to about 170, about 20 $\mu$m to about 160, or about 50 $\mu$m to about 150 $\mu$m. In another example, the granulated carbide composition may have an average particle size from a low of about 200 $\mu$m, about 300 $\mu$m, about 400 $\mu$m, about 500 $\mu$m, about 600 $\mu$m, about 700 $\mu$m, about 800 $\mu$m, about 900 $\mu$m, or about 1 $\mu$m to a high of about 3 mm, about 3.1 mm, about 3.2 mm, about 3.3 mm, about 3.4 mm, about 3.5 mm, about 3.6 mm, about 3.7 mm, about 3.8 mm, about 3.9 mm, about 4.0 mm, or more. The granulated carbide composition may also have an average particle size from about 200 $\mu$m to about 4.0 mm, about 300 $\mu$m to about 3.9 mm, about 400 $\mu$m to about 3.8 mm, about 500 $\mu$m to about 3.7 mm, about 600 $\mu$m to about 3.6 mm, about 700 $\mu$m to about 3.5 mm, about 800 $\mu$m to about 3.4 mm, about 900 $\mu$m to about 3.3 mm, or about 1 mm to about 3.2 mm.

In operation, the layering device 130 may deposit the milled and/or granulated carbide compositions in one or more layers 361, 362 on a substrate or base and subsequently bind the layers 361, 362 to form the first slice 150. The layering device 130 may bind the layers 361, 362 by any suitable method to form the slices 150, 151 of the carbide composite 180. For example, the layering device 130 may include a laser (not shown) capable of heating the carbide compositions to the melting point of the organic binder contained therein. As noted above, heating the organic binder may increase the tack of the organic binder, thereby resulting in the bonding of the carbides, the metal binders, and/or the diamond particles contained in the milled and/or granulated carbide compositions. The laser of the layering device 130 may use the first digital cross-section 135 as a template to bind the layers 361, 362 to form the first slice 150. For example, the laser may trace a cross-sectional area corresponding to the cross-sectional area of the first digital cross-section 135 on the layers 361, 362 of the carbide composition to form the first slice 150. The layering device 130 may then deposit subsequent layers 364, 365 of the milled and/or granulated carbide compositions on or adjacent to the first slice 150. The laser may then trace a cross-sectional area corresponding to the cross-sectional area of the second digital cross-section 136 on the subsequent layers 364, 365 to form the second slice 151. The laser may also be capable of heating the layers 361, 362, 364, 365 to a temperature sufficient to sinter the carbide composition.

The layering device 130 may also deposit the layers 361, 362 of the milled and/or granulated carbide composition in a precise shape or geometry corresponding to the first digital cross-section 135 of the carbide composite 180. The layers 361, 362 of the milled and/or granulated carbide compositions may then be heated to bind the carbide composition and form the first slice 150. The process may then be repeated until the carbide composite 180 is constructed.

As previously discussed, each of the slices 150, 151 may include two or more layers 361, 362, 364, 365 of the carbide composition. Each of the layers 361, 362, 364, 365 of the multi-layer slices 150, 151 may include the carbides, the metal binders, the organic binders, or any mixture or combination thereof. In at least one embodiment, the first layer 361 may include the carbide, the metal binder, or any combination or mixture thereof, and the second layer 362 may include the organic binder. The second layer 362 including the organic binder may facilitate the binding of the carbides and/or the metal binders in the first layer 361. The second layer 362 may also enhance the binding between adjacent slices 150, 151 deposited by the layering device 130. For example, the layering device 130 may form the slices 150, 151 by first depositing the carbide, the metal binder, or any mixture or combination thereof in the first layer 361. The layering device 130 may then deposit the organic binder in the second layer 362 and subsequently heat the second layer 362 to bind the carbide and/or the metal binder in the first layer 361, thereby forming the first fused slice 150. The organic binder in the second layer 362 may also be provided to bind adjacent slices 150, 151 of the carbide composite 180.

One or more properties of the carbide composite 180 fabricated by the layering device 130 may also depend, at least in part, on one or more operating parameters of the layering device 130. For example, the rate at which the layering device 130 deposits the carbide composition may increase and/or decrease the density of the carbide composite 180. The rate and temperature of heating and/or binding the layers 361, 362, 364, 365 or slices 150, 151 may also increase and/or decrease the density of the carbide composite 180.

The density of the carbide composite 180 may also depend, at least in part, on the particle shape, particle size, and/or concentration of the carbide composition deposited by the layering device 130. For example, the density of the carbide composite 180 may be increase and/or decreased by depositing a milled carbide composition as compared to a granulated carbide composition.

The carbide composite 180 fabricated by the layering device 130 via 3D printing may have a density from a low of about 60%, about 65%, or about 70% to a high of about 75%, about 80%, about 85%, about 90%, or more based on a theoretical density of the carbide compositions contained therein. For example, the carbide composite 180 may have a density from about 60% to about 90%, about 65% to about 85%, or about 70% to about 80%. The theoretical density may be the calculated density of the carbide compositions based on the atomic weight and the crystal structure thereof.

The carbide composite 180 fabricated by the layering device 130 via 3D printing may have a toughness, $K_{IC}$ (MPa·m$^{1/2}$), from a low of about 0.5 MPa·m$^{1/2}$, about 1 MPa·m$^{1/2}$, about 2 MPa·m$^{1/2}$, about 3 MPa·m$^{1/2}$, or about 4 MPa·m$^{1/2}$ to a high of about 5 MPa·m$^{1/2}$, about 6 MPa·m$^{1/2}$, about 7 MPa·m$^{1/2}$, about 8 MPa·m$^{1/2}$, about 9 MPa·m$^{1/2}$, about 10 MPa·m$^{1/2}$, about 15 MPa·m$^{1/2}$, or more. For example, the toughness, $K_{IC}$ (MPa·m$^{1/2}$), of the carbide composite 180 may be from about 1 MPa·m$^{1/2}$ to about 15 MPa·m$^{1/2}$, about 2 MPa·m$^{1/2}$ to about 10 MPa·m$^{1/2}$, about 3 MPa·m$^{1/2}$ to about 9 MPa·m$^{1/2}$, or about 4 MPa·m$^{1/2}$ to about 8 MPa·m$^{1/2}$.

The carbide composites 180 fabricated by the layering device 130 via 3D printing may have a strength (MPa) from a low of about 500 MPa, about 600 MPa, about 700 MPa, about 800 MPa, or about 900 MPa to a high of about 1000 MPa, about 1100 MPa, about 1200 MPa, about 1300 MPa, about 1400 MPa, about 1500 MPa, about 1600 MPa, or more. For example, the strength (MPa) of the carbide composite 180 may be from about 500 MPa to about 1600 MPa, about 600 MPa to about 1500 MPa, about 700 MPa to about 1400 MPa, or about 800 MPa to about 1300 MPa.

The carbide composite 180 fabricated by the layering device 130 via 3D printing may have a hardness or a Vickers hardness (kg/mm$^2$) from a low of about 500 kg/mm$^2$, about 800 kg/mm$^2$, about 1000 kg/mm$^2$, about 1200 kg/mm$^2$, or about 1300 kg/mm$^2$ to a high of about 1400 kg/mm$^2$, about 1500 kg/mm$^2$, about 1600 kg/mm$^2$, about 1700 kg/mm$^2$, about 1800 kg/mm$^2$, about 1900 kg/mm$^2$, about 2000 kg/mm$^2$, or more. For example, the hardness (kg/mm$^2$) of the carbide composite 180 may be from about 500 kg/mm$^2$ to about 2000 kg/mm$^2$, about 800 kg/mm$^2$ to about 1900 kg/mm$^2$, about 1000 kg/mm$^2$ to about 1700 kg/mm$^2$, or about 1200 kg/mm$^2$ to about 1500 kg/mm$^2$.

The carbide composite 180 fabricated by the layering device 130 via 3D printing may have also have a Rockwell A Scale hardness (HRA) from a low of about 30 HRA, about 40 HRA, about 45 HRA, about 50 HRA, or about 55 HRA to a high of about 60 HRA, about 65 HRA, about 70 HRA, about 75 HRA, about 80 HRA, about 90 HRA, about 100 HRA, or more. For example, the Rockwell A Scale hardness (HRA) of the carbide composite 180 may be from about 30 HRA to about 100 HRA, about 40 HRA to about 80 HRA, about 45 HRA to about 65 HRA, or about 50 HRA to about 60 HRA.

The carbide composite 180 fabricated by the layering device 130 may be processed by any suitable method known in the art. The processing of the carbide composite 180 may include one or more heating and/or pressing processes. For example, the carbide composite 180 may be subjected to one or more pre-sintering processes to remove the organic binders contained therein. Pre-sintering may include heating the carbide composite 180 under vacuum from a low of about 500° C., about 600° C., about 700° C., about 800° C., about 850° C., about 900° C., about 1000° C. to a high of about 1100° C., about 1150° C., about 1200° C., about 1250° C., about 1300° C., about 1400° C., or more. For example, pre-sintering may include heating the carbide composite 180 from about 500° C. to about 1400° C., about 600° C. to about 1300° C., about 700° C. to about 1200° C., about 800° C. to about 1100° C., or about 850° C. to about 1000° C.

The carbide composite 180 may also be subjected to one or more heating and pressing processes to provide a cemented carbide composite. For example, the carbide composite 180 may be heated and pressed in a sintering process to provide the cemented carbide composite. Sintering the carbide composite 180 may cause the metal binder to melt and bind with the carbides to provide a metal matrix where the metal binder acts as a matrix material and the carbides act as an aggregate material in the metal matrix. Sintering may increase the density, strength, toughness, and/or the hardness of the carbide composite 180. Illustrative sintering processes may include, but are not limited to, vacuum sintering, hot isostatic pressing (HIP), or any combination thereof. HIP may be performed in a gaseous (e.g., inert argon or helium) atmosphere contained within a pressure vessel. The gaseous atmosphere as well as the carbide composite 180 to be pressed are heated by a furnace within the vessel.

Sintering may include heating the carbide composite 180 from a low of about 1000° C., about 1100° C., about 1200° C., about 1300° C., about 1400° C., about 1500° C. to a high of about 1600° C., about 1700° C., about 1800° C., about 1900° C., about 2000° C., or more. For example, sintering may include heating the carbide composite 180 from about 1000° C. to about 2000° C., about 1100° C. to about 1900° C., about 1200° C. to about 1800° C., about 1300° C. to about 1700° C., or about 1400° C. to about 1600° C.

The sintered carbide composite 180 fabricated by the layering device 130 via 3D printing may have a density from a low of about 80%, about 85%, or about 90% to a high of about 95%, about 95%, about 99%, about 99.5%, or more based on a theoretical density of the carbide compositions contained therein. For example, the carbide composite 180 may have a density from about 80% to about 99.5%, about 85% to about 99%, or about 90% to about 95%. The sintered carbide composite 180 may also have a density from a low of about 90%, about 91%, about 92%, about 93%, about 94%, or about 95% to a high of about 96%, about 97%, about 98%, about 99%, about 99.5%, or more.

The sintered carbide composite 180 fabricated by the layering device 130 via 3D printing may have a toughness, $K_{IC}$ (MPa·m$^{1/2}$) from a low of about 1.5 MPa·m$^{1/2}$, about 2 MPa·m$^{1/2}$, about 3 MPa·m$^{1/2}$, about 4 MPa·m$^{1/2}$, or about 5 MPa·m$^{1/2}$ to a high of about 6 MPa·m$^{1/2}$, about 7 MPa·m$^{1/2}$, about 8 MPa·m$^{1/2}$, about 9 MPa·m$^{1/2}$, about 10 MPa·m$^{1/2}$, about 15 MPa·m$^{1/2}$, about 25 MPa·m$^{1/2}$, or more. For example, the toughness, $K_{IC}$ (MPa·m$^{1/2}$), of the carbide composite 180 may be from about 1 MPa·m$^{1/2}$ to about 50 MPa·m$^{1/2}$, about 2 MPa·m$^{1/2}$ to about 30 MPa·m$^{1/2}$, about 3 MPa·m$^{1/2}$ to about 20 MPa·m$^{1/2}$, or about 15 MPa·m$^{1/2}$ to about 10 MPa·m$^{1/2}$.

The sintered carbide composite 180 fabricated by the layering device 130 via 3D printing may have a strength (MPa) from a low of about 1000 MPa, about 1100 MPa, about 1200 MPa, about 1300 MPa, or about 1400 MPa to a high of about 1500 MPa, about 1600 MPa, about 1700 MPa, about 1800 MPa, about 1900 MPa, about 2000 MPa, about 2500 MPa, about 3000 MPa, or more. For example, the strength (MPa) of the carbide composite 180 may be from about 1000 MPa to about 3000 MPa, about 1200 MPa to about 2500 MPa, about 1300 MPa to about 2500 MPa, or about 1400 MPa to about 1800 MPa.

The sintered carbide composite 180 fabricated by the layering device 130 via 3D printing may have a hardness or a Vickers hardness (kg/mm$^2$) from a low of about 1000 kg/mm$^2$, about 1100 kg/mm$^2$, about 1200 kg/mm$^2$, about 1300 kg/mm$^2$, or about 1400 kg/mm$^2$ to a high of about 1600 kg/mm$^2$, about 1700 kg/mm$^2$, about 1800 kg/mm$^2$, about 1900 kg/mm$^2$, about 2000 kg/mm$^2$, about 2100 kg/mm$^2$, about 2500 kg/mm$^2$, about 3000 kg/mm$^2$, or more. For example, the hardness (kg/mm$^2$) of the carbide composite 180 may be from about 1000 kg/mm$^2$ to about 3000 kg/mm$^2$, about 2500 kg/mm$^2$ to about 2100 kg/mm$^2$, about 1300 kg/mm$^2$ to about 2000 kg/mm$^2$, or about 1400 kg/mm$^2$ to about 1800 kg/mm$^2$.

The sintered carbide composite 180 fabricated by the layering device 130 via 3D printing may have also have a Rockwell A Scale hardness (HRA) from a low of about 50 HRA, about 60 HRA, about 65 HRA, about 70 HRA, or about 75 HRA to a high of about 80 HRA, about 85 HRA, about 90 HRA, about 95 HRA, about 100 HRA, about 110 HRA, about 120 HRA, or more. For example, the Rockwell A Scale hardness (HRA) of the carbide composite 180 may be from about 50 HRA to about 120 HRA, about 60 HRA to about 100 HRA, about 65 HRA to about 85 HRA, or about 70 HRA to about 80 HRA.

The carbide composites 180 may be used in and/or on one or more downhole tools. The downhole tools for which the carbide composites 180 may be fabricated may include well drilling equipment, well drilling tools, well completion equipment, well completion tools, and/or associated components thereof. Illustrative downhole tools may include, but are not limited to, rotors, stators, and/or housings for downhole drilling motors, blades and/or housings for downhole turbines, cones for roller cone drill bits, drill bits or bit heads, bearings, and other downhole tools having complex configurations and/or asymmetric geometries requiring a cemented carbide composite 180.

Figure 4:
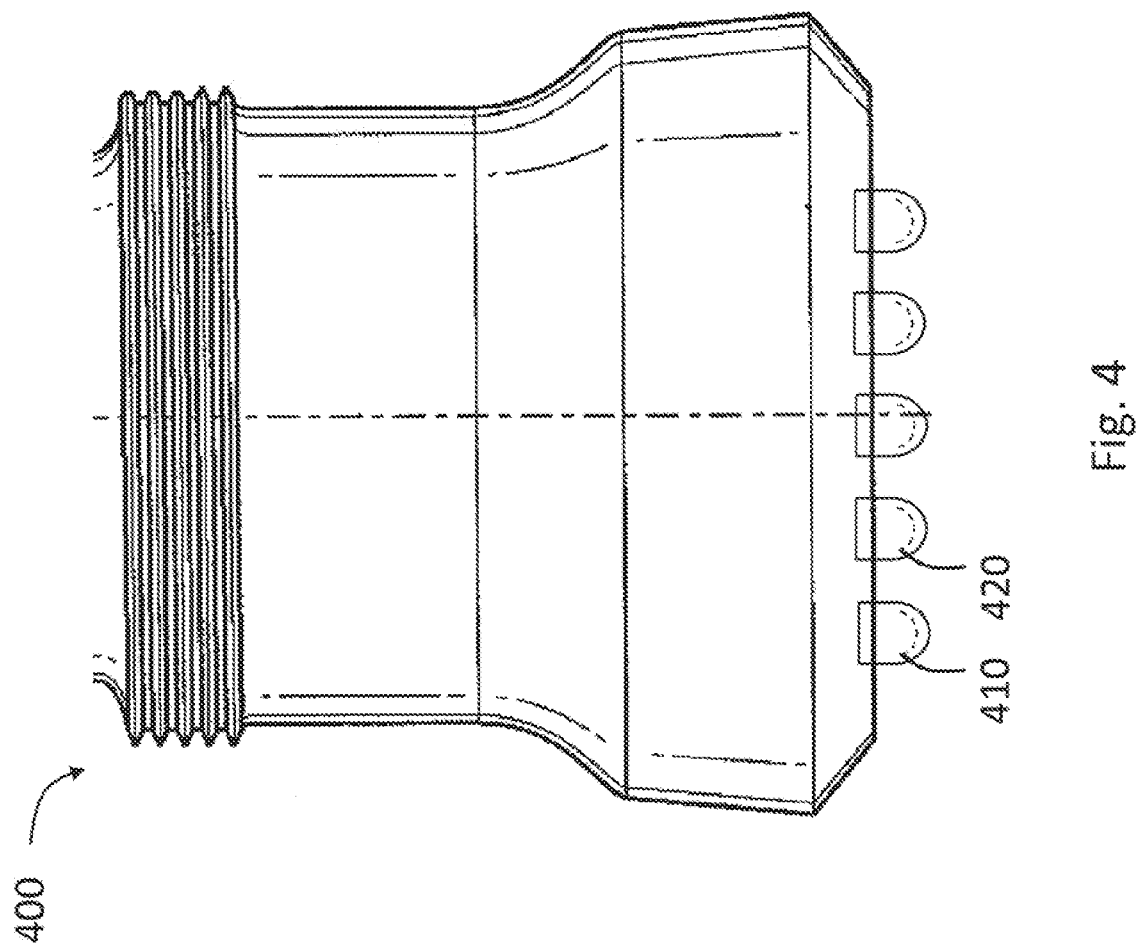
FIG. 4 depicts a side view of an illustrative downhole tool including inserts fabricated via 3D printing, according to one or more embodiments disclosed.

The carbide composite 180 may be an insert and/or cutting element for a downhole tool (e.g., drill bit). FIG. 4 depicts a side view of an illustrative downhole tool 400 including inserts 410, 420 fabricated via 3D printing, according to one or more embodiments. The inserts 410, 420 may include polycrystalline diamond (PCD) inserts, tungsten carbide inserts, tungsten carbide inserts having a super-abrasive surface, such as natural or synthetic diamond, polycrystalline diamond, polycrystalline cubic boron nitride (PCBN), or inserts constructed of a matrix of tungsten carbide and other materials, or any combination thereof. The inserts 410, 420 may be fabricated by providing the carbide composite as a substrate and subsequently providing one or more layers of PCD and/or PCBN to the carbide composite substrate to provide the inserts 410, 420. For example, a carbide composite 180 may be fabricated as a substrate and layers of PCD and/or PCBN may be subsequently deposited by the layering device 130 to provide the insert 410, 420. The inserts 410, 420 may have any shape suitable for the downhole tool 400. For example, the inserts 410, 420 may have a cylindrical shape with a semi-round top, a conical top, or a frustoconical top. The inserts 410, 420 may include one or more PCD and/or PCBN layers. Illustrative downhole tools 400 for which the inserts 410, 420 may be utilized may include, but are not limited to, a blade, a drill bit, a section mill, an underreamer, a stabilizer, a friction brake, a sensor, a pipe cutter, a fishing tool, or any other downhole tool 400 subjected to wear in downhole operations.

Polycrystalline diamond may include a plurality of diamond grains directly bonded together via diamond-to-diamond bonding to define a plurality of interstitial regions. A portion of the interstitial regions may be occupied by a metal catalyst. The metal catalyst may include one or more of the metal binders previously discussed (e.g., iron, nickel, cobalt, or alloys thereof). The layering device 130 may fabricate the carbide composite 180 with a carbide composition including a mixture of the carbide (e.g. WC), the metal binder (e.g., Co), the organic binder, and/or the diamond particles. The first slice 150 of the carbide composite 180 may include a carbide composition including the carbide (e.g., WC) and the metal binder (e.g., Co), and the second slice 151 of the carbide composite 180 may include the diamond particles. The carbide composite 180 may be subjected to one or more heating and/or pressing processes (e.g., sintering) to provide the PCD inserts 410, 420.

Although only a few embodiments have been described in detail above, those skilled in the art will readily appreciate that many modifications are possible in the embodiments without materially departing from the present disclosure. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

What is claimed is:

1. A method for fabricating a carbide composite for a downhole tool, comprising:
   depositing a first layer on a substrate, the first layer comprising one or more first carbides, the first layer being from about 0.0005 cm to about 0.06 cm thick;
   depositing a second layer at least partially adjacent the first layer, the second layer comprising one or more second carbides, metal binders, organic binders, or a combination thereof, the second layer being from about 0.0005 cm to about 0.06 cm thick, and wherein the first and second layers have a different particle size, particle shape, carbide concentration, metal binder concentration, or organic binder concentration from one another; and
   binding the first and second layers to form the carbide composite,
   wherein the first and second layers are formed by additive manufacturing using a CAD assembly.

2. The method of claim 1, further comprising heating and pressing the carbide composite.

3. The method of claim 2, wherein at least one of the first or second layers comprises diamond particles, and wherein heating and pressing the carbide composite provides a polycrystalline diamond insert for the downhole tool.

4. The method of claim 1, wherein the first and second carbides are individually selected from the group consisting of titanium carbide, vanadium carbide, chromium carbide, zirconium carbide, niobium carbide, molybdenum carbide, hafnium carbide, tantalum carbide, tungsten carbide, and combinations thereof.

5. The method of claim 1, wherein the metal binders are selected from the group consisting of ruthenium, osmium, iron, cobalt, and combinations thereof.

6. The method of claim 1, wherein the metal binders are selected from the group consisting of lithium, sodium, potassium, rubidium, cesium, and combinations thereof.

7. The method of claim 1, wherein the organic binders are selected from the group consisting of polyolefins, polyol ether-esters, chlorinated naphthalenes, hydrocarbon waxes, and combinations thereof.

8. The method of claim 1, further comprising milling one or more components of the first or second layers before depositing the first and second layers.

9. The method of claim 8, wherein milling coats the first carbide with a second organic binder or the second carbide with the organic binder.

10. The method of claim 1, further comprising granulating the components of the first or second layers before depositing the first and second layers to facilitate flow of the components.

11. The method of claim 1, wherein binding the first and second layers forms the carbide composite having a density from about 75% to about 85% based on a theoretical density of the carbide composite.

12. The method of claim 1, further comprising pre-sintering the carbide composite to remove at least a portion of the organic binder contained therein.

13. A method for fabricating a carbide composite for a downhole tool, comprising:
    depositing a carbide layer on a substrate, the carbide layer comprising tungsten carbide and cobalt, the carbide layer being from about 0.0005 cm to about 0.06 cm thick;
    depositing a second layer at least partially on the carbide layer, the second layer comprising one or more carbides, metal binders, organic binders, diamond particles, or a combination thereof, the second layer being from about 0.0005 cm to about 0.06 cm thick, and wherein the carbide layer and the second layer have a different particle size, particle shape, carbide concentration, metal binder concentration, diamond particle concentration, or organic binder concentration from one another;
    binding the carbide layer and second layers to form the carbide composite; and
    sintering the carbide composite to form a polycrystalline diamond insert,
    wherein the carbide layer and the second layer are formed by additive manufacturing using a CAD assembly.

14. The method of claim 13, wherein sintering the carbide composite comprises heating and pressing the carbide composite.

15. The method of claim 13, wherein the second layer comprises a carbide selected from the group consisting of titanium carbide, vanadium carbide, chromium carbide, zirconium carbide, niobium carbide, molybdenum carbide, hafnium carbide, tantalum carbide, tungsten carbide, and combinations thereof.

16. The method of claim 13, wherein the second layer comprises a metal binder selected from the group consisting of magnesium, ruthenium, osmium, iron, cobalt, nickel, copper, molybdenum, tantalum, tungsten, rhenium, and combinations thereof.

17. The method of claim 13, wherein sintering the carbide composite comprises vacuum sintering the carbide composite or hot isostatic pressing the carbide composite.

18. The method of claim 1, wherein the CAD assembly includes a digital design.

19. The method of claim 18, wherein a layering device uses the digital design as a template to form the carbide composite.

20. The method of claim 13, wherein the CAD assembly includes a digital design.

\* \* \* \* \*